Oct. 28, 1947.   E. H. ZIMMER   2,429,738
ANTISKID DEVICE
Filed Jan. 26, 1946   2 Sheets-Sheet 1

INVENTOR,
Eric H. Zimmer,
BY
ATTORNEY.

Oct. 28, 1947.  E. H. ZIMMER  2,429,738
ANTISKID DEVICE
Filed Jan. 26, 1946  2 Sheets-Sheet 2
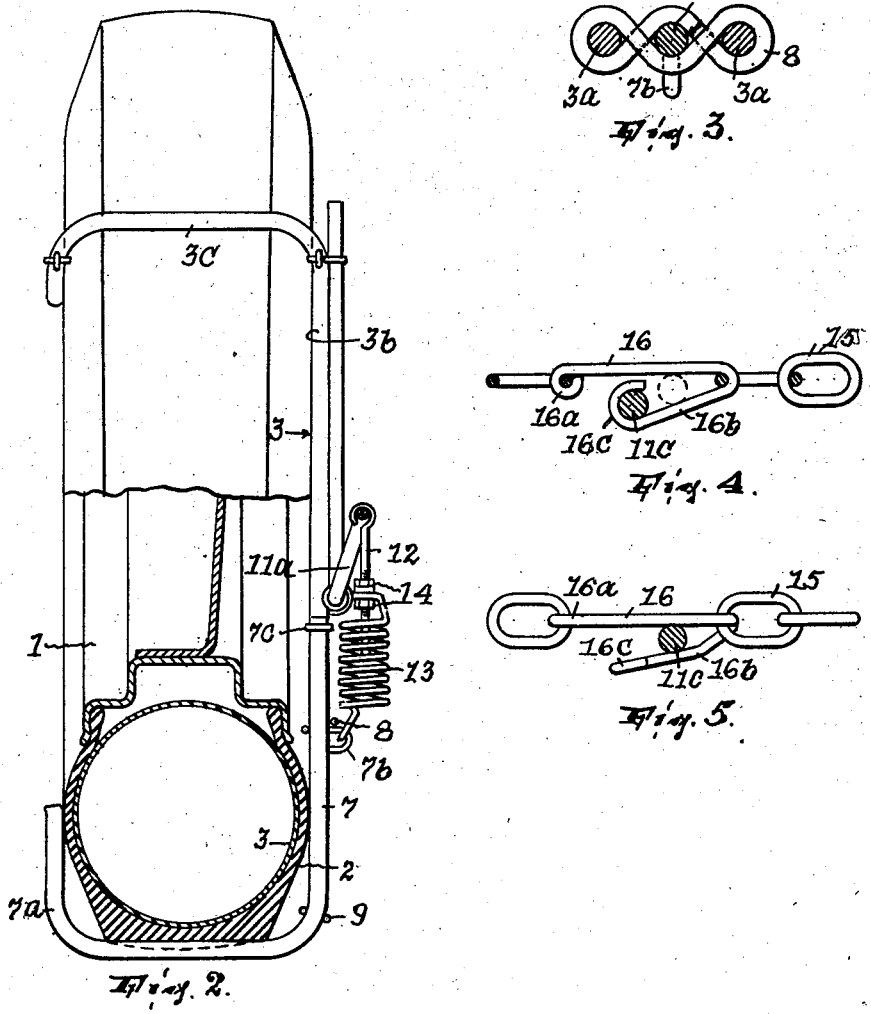
INVENTOR,
Eric H. Zimmer,
BY
ATTORNEY.

Patented Oct. 28, 1947

2,429,738

UNITED STATES PATENT OFFICE 2,429,738

ANTISKID DEVICE

Eric H. Zimmer, Wyckoff, N. J.

Application January 26, 1946, Serial No. 643,524

9 Claims. (Cl. 152—225)

This invention relates to anti-skid appliances for application to automobile wheels and, whereas it may be used in any condition where skidding is to be prevented, it is particularly intended to be resorted to in emergency, as where there is failure of sufficient traction for putting the vehicle into motion. The appliance is so constructed that the operation of applying it to a driving wheel of the vehicle is readily effected, without jacking up the vehicle and entirely from the outer side of the wheel, or without requiring manipulation at the inner side of any of the parts of the appliance. It is simple in construction and may be applied to wheels varying appreciably in diameter.

In the drawings,

Fig. 2 shows the appliance and wheel in section on line 2—2 of Fig. 1, the wheel-tread otherwise appearing in elevation;

Fig. 3 is a section of certain parts on line 3—3, Fig. 1;

Figs. 4 and 5 are fragmentary sections on line 4—4, Fig. 1, with the chain shown respectively in its normal and distorted positions.

Figure 1:
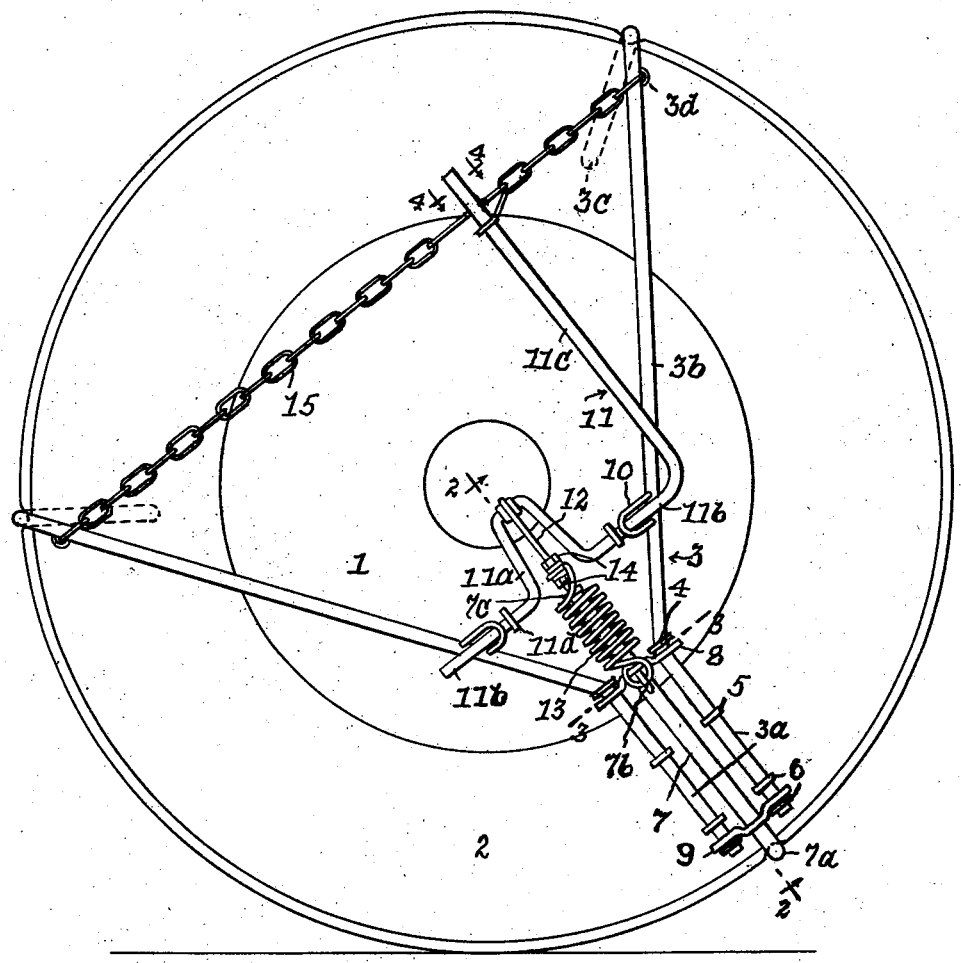
Fig. 1 is a side elevation of the appliance applied to a conventional pneumatic-tired wheel only generally shown.

Let 1 be the wheel proper and 2 and 1 the tire and inner tube, respectively, of a pneumatic-tired wheel.

The traction elements of my appliance exist as three members all having hook-portions to hook over the tread of the tire, two of them being reverse counterparts of each other. To provide each of such two members a rod 3 of stiff metal is so formed that its straight relatively short end portion 3a is in bias relation to its straight long end portion 3b, the latter having its free end bent out of the plane of the portions 3a—3b to form a hook 3c shaped to hook over the tire tread as shown in Figs. 1 and 2. The rod has abutments, here in the form of collars, on its end portion 3a, one, 4, at the juncture of portions 3a and 3b, one, 5, about midway the length of portion 3a and a pair, 6, somewhat spaced from each other, on the free end of such portion. In the assembled state of the appliance and wheel the parts 3 have their portions 3a spaced and parallel and their portions 3b diverging, whereby they together present a Y-form. The rods 3 are made of such length, as shown in Figure 1, that each is of sufficient length substantially diagonally to span the tire when in operative relationship therewith, so that the inner end 3a and the outer hook carrying end 3b of each contacts the outer sidewall of the tire at widely spaced locations. This construction allows the assembly to be held stably and securely on the tire when affixed thereon. The third part, 7, is also a stiff metal rod formed straight excepting that one end is bent off to form a hook 7a shaped like the hooks of the parts 3 to hook over the tire tread. In its assembled state it extends radially of the wheel and between the portions 3a of the members 3. Member 7 has a staple 7b. This member 7 and the portions 3a of members 3 are held in their generally parallel relation by couplings 8 and 9 each of which they loosely penetrate, coupling 8 being confined between the abutments 4 and 5 and coupling 9 between the abutments of the pairs 6. Each member 3 may freely slide in the couplings lengthwise independently of the other such member and it may also move lengthwise independently with some canting of the couplings; it may also undergo rotation in the couplings around the axis of its portion 3a. Member 7 has its radially outward sliding movement limited by contact of its collar 7c with coupling 8.

The portions 3b of members 3 have bearings projecting therefrom in the form of staples 10 which, when the two members are in their operative state and hence lie in approximately the same plane (Fig. 1), converge from the wheel. In these bearings is fulcrumed a lever 11. This is formed from a rod bent to form a crank or load arm 11a and leave a fulcrum or main bearing portion 11b at each side thereof, and also to form a power-applying arm or handle 11c extending angularly from one fulcrum portion in the same direction as the load arm. On the fulcrum portions, which are arranged in the bearings 10, are collars 11d which confine the lever against undue displacement axially of said fulcrum portions.

A hook 12 has its hooked end engaged with the crank or load arm of the lever and connecting the hook and staple 7b of member 7 is a spring 13. The spring has one end looped around the hook-shank, which is threaded and has screwed thereon nuts 14 clamping the spring-loop.

Connecting the end portions 3b of members 3 is a chain 15 whose end links are penetrated by such end portions and are held against displacement lengthwise thereof by staples 3d. The chain serves to limit the spread of the portions 3b of members 3 and also, as will appear, to confine the lever 11 detachably in the operative position shown, for which purpose it may include a link 16 formed as follows: The link is forked and has the free end of one arm thereof formed with a loop 16a embracing the left-hand adjoining link; the other arm 16b is bent both forwardly (Fig. 4) and downwardly (Fig. 5) in bias relation to the loop-including arm, thus forming the link in effect as a hook, the terminal of the arm 16b being rebent generally toward the other arm to form a hook 16c. In the shown state of the parts (Fig. 4) the lever-handle 11c lies between the arms of link 16 and in hook 16c. But if the handle (the lever being somewhat elastic) is urged into the position of Fig. 5 the handle may clear the link when it is then allowed to shift to the left. The link 16 is assumed in Fig. 5 to have been turned around the longitudinal axis of the chain about 90° after the handle has been shifted to the right.

The appliance is assembled with the wheel as follows: With the lever 11 released from chain 15, and extending to the right in Fig. 2 in angular relation to the position shown, the member 7 and the structure comprising the members 3 (intercoupled at 8—9) will be so disposed that the appliance may be fitted over the tire. That is to say, the members 3 may then be hooked over the tire and then the member 7 hooked under the tire, this operation being effected with the tire resting on the ground. Then the lever is turned reversely or to its shown position and engaged by the chain in the manner already indicated. By proper adjustment of the tension of the spring—to wit, by the nuts 14—the appliance will grip the tire securely, or so as to hold thereto against rotary slippage.

When the appliance is removed it may be folded into quite small compass, to wit, around the axes of the portions 3a of members 3, or here from the observer in Fig. 1, for which purpose the staples 10 converge in the way set forth.

Given any means (here in the form of a lever) for displacing the said members in the respective directions to impinge their hooks against the wheel tread, an important feature of my invention is a spring (such as 13) as a part of such means. For instance, without the spring, when member 7 contacts the ground the entire assembly may be so displaced as to appreciably reduce the grip of the hooks at 3c on the tire; but, with the spring present, only member 7 would in such case yield (upwardly), members 3 retaining their grip on the tire at 3c.

Having thus fully described my invention what I claim is:

1. In an anti-skid appliance for a vehicle wheel, an assembly to span the wheel including a pair of elongated members having end portions thereof in side-by-side relation and their remaining portions diverging and formed at their free ends as hooks to hook over the wheel tread, a third elongated member between said end portions and formed with a hook to hook over the wheel tread, means to guide the pair of members and the third member, when said assembly is associated with the wheel, in lines crossing the wheel tread as viewed axially of the wheel, and means to displace said pair of members and the third member in the respective directions to impinge their hooks against the tread.

2. The assembly set forth in claim 1 characterized by the last-named means including a spring.

3. In an anti-skid appliance for a vehicle wheel, an assembly to span the wheel including a pair of elongated members having end portions thereof in side-by-side relation and their remaining portions diverging and formed at their free ends as hooks to hook over the wheel tread, a third elongated member between said end portions and formed with a hook to hook over the wheel tread, means to guide the pair of members and the third member, when said assembly is associated with the wheel, in lines crossing the wheel tread as viewed axially of the wheel, and means to displace said pair of members and the third member in the respective directions to impinge their hooks against the tread including a lever fulcrumed in said pair of members with its fulcrum axis traversing the same.

4. In an anti-skid appliance for a vehicle wheel, an assembly to span the wheel including a pair of elongated members having end portions thereof in side-by-side relation and their remaining portions diverging and formed at their free ends as hooks to hook over the wheel tread, a third elongated member between said end portion and formed with a hook to hook over the wheel tread, means to guide the pair of members and the third member, when said assembly is associated with the wheel, in lines crossing the wheel tread as viewed axially of the wheel, means to displace said pair of members and the third member in the respective directions to impinge their hooks against the tread including a lever fulcrumed in said pair of members with its fulcrum axis traversing the same, said lever having a handle angularly related to said axis, and means, connecting the diverging portions of said pair of members, to which the handle is releasably connected.

5. In an anti-skid appliance for a vehicle wheel, having a tire thereon, an assembly to span the wheel and tire including a pair of members and a third member each having a hook on its outer end to hook over the tire tread at regularly spaced intervals thereof, each pair of members being of sufficient length substantially diagonally to span the tire when in operative relationship therewith so that the inner end of each of the pair of members and the outer hook carrying end of each such member contacts the sidewall of the tire at widely spaced locations, said assembly also including, with means to guide the pair of members and the third member when said assembly is associated with the wheel, in lines crossing the tire tread as viewed axially of the wheel, means to displace said pair of members and the third member inwardly toward each other in the respective directions to impinge their hooks against the tire tread.

6. In an anti-skid appliance for a vehicle wheel having a tire thereon, an assembly to span the wheel and tire including a pair of members connected together at their inner ends and a third member movable relatively to the pair of members, the pair of members and the third member each having a hook on its outer end to hook over the tire tread at regularly spaced intervals thereof, each of the pair of members being of sufficient length substantially diagonally to span the tire when in operative relationship therewith so that the inner end of each of the pair of members and the outer hook carrying end of each such member contacts the sidewall of the tire at widely spaced locations, said assembly also including with means to guide the third member for motion with respect to the pair of members when said assembly is associated with the wheel in lines crossing the tire tread as viewed axially of the wheel, means to displace said pair of members and the third member inwardly toward each other in the respective directions to impinge their hooks against the tire tread.

7. In an anti-skid appliance for a vehicle wheel having a tire thereon, an assembly to span the wheel and tire including a pair of members connected together at their inner ends and a third member movable relatively to the pair of members, the pair of members and the third member each having a hook on its outer end to hook over the tire tread at regularly spaced intervals thereof, each of the pair of members being of sufficient length substantially diagonally to span the tire when in operative relationship therewith so that the inner end of each of the pair of members and the outer hook carrying end of each such member contacts the sidewall of the tire at widely spaced locations, said assembly also including, with means to guide the third member for motion with respect to the pair of members when said assembly is associated with the wheel in lines crossing the tire tread as viewed axially of the wheel, means to displace said pair of members and the third member inwardly toward each other in the respective directions to impinge their hooks against the tire tread, said last named means including a crank positioned crosswise of and fulcrumed in the pair of members, the axis of the main bearings of the crank lying in a plane parallel to the plane containing the pair of members, and means connecting the arm of the crank to the third member.

8. In an anti-skid appliance for a vehicle wheel having a tire thereon, an assembly to span the wheel and tire including a pair of members connected together at their inner ends and a third member movable relatively to the pair of members, the pair of members and the third member each having a hook on its outer end to hook over the tire tread at regularly spaced intervals thereof, each of the pair of members being of sufficient length substantially diagonally to span the tire when in operative relationship therewith so that the inner end of each of the pair of members and the outer hook carrying end of each such member contacts the sidewall of the tire at widely spaced locations, said assembly also including, with means to guide the third member for motion with respect to the pair of members when said assembly is associated with the wheel in lines crossing the tire tread as viewed axially of the wheel, means to displace said pair of members and the third member inwardly toward each other in the respective directions to impinge their hooks against the tire tread, said last named means including a crank positioned crosswise of and fulcrumed in the pair of members, the axis of the main bearings of the crank lying in a plane parallel to the plane containing the pair of members, and a link connecting the arm of the crank to the third member, said link including a helical spring connected in series and in tension, and an operating lever connected to the crank.

9. In an anti-skid appliance for a vehicle wheel having a tire thereon, an assembly to span the wheel and tire including a pair of members connected together at their inner ends and a third member movable relatively to the pair of members, the pair of members and the third member each having a hook on its outer end to hook over the tire tread at regularly spaced intervals thereof, each of the pair of members being of sufficient length substantially diagonally to span the tire when in operative relationship therewith so that the inner end of each of the pair of members and the outer hook carrying end of each such member contacts the sidewall of the tire at widely spaced locations, said assembly also including, with means to guide the third member for motion with respect to the pair of members when said assembly is associated with the wheel in lines crossing the tire tread as viewed axially of the wheel, means to displace said pair of members and the third member inwardly toward each other in the respective directions to impinge their hooks against the tire tread, said last named means including a crank positioned crosswise of and fulcrumed in the pair of members, the axis of the main bearings of the crank lying in a plane parallel to the plane containing the pair of members, and a link connecting the arm of the crank to the third member, said link including a helical spring connected in series and in tension, and an operating lever connected to the crank, the lever being so positioned relative to the crank arm that it lies substantially parallel to the wheel when the hooks on the members are in tight contact with the tire tread, and means mounted on the assembly for engagement with the handle to hold it in such position parallel with the wheel.

ERIC H. ZIMMER.

REFERENCES CITED

The following references are of record in the file of this patent:

UNITED STATES PATENTS

| Number | Name | Date |
|---|---|---|
| 1,882,376 | Weber | Oct. 11, 1932 |
| 1,394,962 | Bate | Oct. 25, 1921 |
| 1,769,307 | Price | July 1, 1930 |